US008620952B2

(12) United States Patent
Bennett et al.

(10) Patent No.: US 8,620,952 B2
(45) Date of Patent: Dec. 31, 2013

(54) SYSTEM FOR DATABASE REPORTING

(75) Inventors: Dominic V. Bennett, Los Altos, CA (US); Dan Hu, Cupertino, CA (US)

(73) Assignee: Carhamm Ltd., LLC, Dover, DE (US)

( * ) Notice: Subject to any disclaimer, the term of this patent is extended or adjusted under 35 U.S.C. 154(b) by 10 days.

(21) Appl. No.: 11/619,539

(22) Filed: Jan. 3, 2007

(65) Prior Publication Data

US 2008/0162562 A1   Jul. 3, 2008

(51) Int. Cl.
*G06F 17/00*   (2006.01)

(52) U.S. Cl.
USPC .......................................... 707/778; 707/807

(58) Field of Classification Search
USPC .................. 715/744; 707/778, 807
See application file for complete search history.

(56) References Cited

U.S. PATENT DOCUMENTS

| | | |
|---|---|---|
| 4,977,594 A | 12/1990 | Shear |
| 5,247,517 A | 9/1993 | Ross et al. |
| 5,315,580 A | 5/1994 | Phaal |
| 5,446,919 A | 8/1995 | Wilkins |
| 5,481,741 A | 1/1996 | McKaskle et al. |
| 5,608,850 A | 3/1997 | Robertson |
| 5,617,526 A | 4/1997 | Oran et al. |
| 5,627,886 A | 5/1997 | Bowman |
| 5,638,443 A | 6/1997 | Stefik et al. |
| 5,642,484 A | 6/1997 | Harrison, III et al. |
| 5,675,510 A | 10/1997 | Coffey et al. |
| 5,682,525 A | 10/1997 | Bouve et al. |
| 5,706,502 A | 1/1998 | Foley et al. |
| 5,708,709 A | 1/1998 | Rose |
| 5,708,780 A | 1/1998 | Levergood et al. |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |

(Continued)

FOREIGN PATENT DOCUMENTS

| | | |
|---|---|---|
| EP | 0822535 | 2/1998 |
| EP | 1045547 | 10/2000 |

(Continued)

OTHER PUBLICATIONS

PCT International Search Report of the International Searching Authority for International Application PCT/US2004/034015, mailed May 4, 2006, 3 pages.

(Continued)

*Primary Examiner* — Paul Kim
(74) *Attorney, Agent, or Firm* — Brundidge & Stanger, P.C.

(57) ABSTRACT

A method of creating user-generated reports. The method begins with the step of receiving information related to consumer internet behavior. That information is then assembled into a database having facts and dimensions, in which the database resides on a server, the server being connected to a communications network. The method then provides a report generation system, including a report generation module resident on the server. The module generates a report, beginning with accepting user criteria for generating a report from a front end system resident on a client computer. It then generates from the database a dataset corresponding to the first report and forwards the same to the client computer, and it displays the report generated from the first dataset. The module then reiterates the report generation steps to generate a second report, the first report remaining resident on the client computer.

9 Claims, 8 Drawing Sheets

(56) References Cited

U.S. PATENT DOCUMENTS

| | | | |
|---|---|---|---|
| 5,724,521 | A | 3/1998 | Dedrick |
| 5,724,567 | A | 3/1998 | Rose et al. |
| 5,734,863 | A | 3/1998 | Kodosky et al. |
| 5,745,681 | A | 4/1998 | Levine et al. |
| 5,751,956 | A | 5/1998 | Kirsch |
| 5,754,938 | A | 5/1998 | Herz et al. |
| 5,758,111 | A | 5/1998 | Shiratori et al. |
| 5,761,662 | A | 6/1998 | Dasan |
| 5,787,253 | A | 7/1998 | McCreery et al. |
| 5,794,210 | A | 8/1998 | Goldhaber et al. |
| 5,794,259 | A | 8/1998 | Kikinis |
| 5,796,952 | A | 8/1998 | Davis et al. |
| 5,809,242 | A | 9/1998 | Shaw et al. |
| 5,812,642 | A | 9/1998 | Leroy |
| 5,812,769 | A | 9/1998 | Graber et al. |
| 5,819,047 | A | 10/1998 | Bauer et al. |
| 5,819,092 | A | 10/1998 | Ferguson et al. |
| 5,822,526 | A | 10/1998 | Waskiewicz |
| 5,832,502 | A | 11/1998 | Durham et al. |
| 5,835,087 | A | 11/1998 | Herz et al. |
| 5,835,722 | A | 11/1998 | Bradshaw et al. |
| 5,848,396 | A | 12/1998 | Gerace |
| 5,854,897 | A | 12/1998 | Radziewicz et al. |
| 5,872,850 | A | 2/1999 | Klein et al. |
| 5,875,296 | A | 2/1999 | Shi et al. |
| 5,883,955 | A | 3/1999 | Ronning |
| 5,887,133 | A | 3/1999 | Brown et al. |
| 5,893,118 | A | 4/1999 | Sonderegger |
| 5,898,434 | A | 4/1999 | Small et al. |
| 5,901,287 | A | 5/1999 | Bull et al. |
| 5,905,492 | A | 5/1999 | Straub et al. |
| 5,918,014 | A | 6/1999 | Robinson |
| 5,920,697 | A | 7/1999 | Masters et al. |
| 5,923,845 | A | 7/1999 | Kamiya et al. |
| 5,930,700 | A | 7/1999 | Pepper et al. |
| 5,933,811 | A | 8/1999 | Angles et al. |
| 5,937,037 | A | 8/1999 | Kamel et al. |
| 5,943,478 | A | 8/1999 | Aggarwal et al. |
| 5,948,061 | A | 9/1999 | Merriman et al. |
| 5,958,015 | A | 9/1999 | Dascalu |
| 5,959,621 | A | 9/1999 | Nawaz et al. |
| 5,961,593 | A | 10/1999 | Gabber et al. |
| 5,963,915 | A | 10/1999 | Kirsch |
| 5,978,836 | A | 11/1999 | Ouchi |
| 5,987,606 | A | 11/1999 | Cirasole et al. |
| 5,991,735 | A | 11/1999 | Gerace |
| 5,995,597 | A | 11/1999 | Woltz et al. |
| 5,996,011 | A | 11/1999 | Humes |
| 5,999,740 | A | 12/1999 | Rowley |
| 6,006,252 | A | 12/1999 | Wolfe |
| 6,009,410 | A | 12/1999 | LeMole et al. |
| 6,011,537 | A | 1/2000 | Slotznick |
| 6,014,502 | A | 1/2000 | Moraes |
| 6,014,638 | A | 1/2000 | Burge et al. |
| 6,014,711 | A | 1/2000 | Brown |
| 6,026,368 | A | 2/2000 | Brown et al. |
| 6,026,933 | A | 2/2000 | King et al. |
| 6,029,141 | A | 2/2000 | Bezos et al. |
| 6,029,195 | A | 2/2000 | Herz |
| 6,047,327 | A | 4/2000 | Tso et al. |
| 6,052,709 | A | 4/2000 | Paul |
| 6,052,730 | A | 4/2000 | Felciano et al. |
| 6,055,573 | A | 4/2000 | Gardenswartz et al. |
| 6,065,056 | A | 5/2000 | Bradshaw et al. |
| 6,067,561 | A | 5/2000 | Dillon |
| 6,070,140 | A | 5/2000 | Tran |
| 6,073,105 | A | 6/2000 | Sutcliffe et al. |
| 6,073,241 | A | 6/2000 | Rosenberg et al. |
| 6,076,166 | A | 6/2000 | Moshfeghi et al. |
| 6,078,916 | A | 6/2000 | Culliss |
| 6,088,731 | A | 7/2000 | Kiraly et al. |
| 6,101,510 | A | 8/2000 | Stone et al. |
| 6,108,637 | A | 8/2000 | Blumenau |
| 6,108,691 | A | 8/2000 | Lee et al. |
| 6,108,799 | A | 8/2000 | Boulay et al. |
| 6,112,215 | A | 8/2000 | Kaply |
| 6,115,680 | A | 9/2000 | Coffee et al. |
| 6,119,098 | A | 9/2000 | Guyot et al. |
| 6,122,632 | A | 9/2000 | Botts et al. |
| 6,128,663 | A | 10/2000 | Thomas |
| 6,133,912 | A | 10/2000 | Montero |
| 6,133,918 | A | 10/2000 | Conrad et al. |
| 6,134,532 | A | 10/2000 | Lazarus et al. |
| 6,138,146 | A | 10/2000 | Moon et al. |
| 6,138,155 | A | 10/2000 | Davis et al. |
| 6,141,010 | A | 10/2000 | Hoyle |
| 6,144,944 | A | 11/2000 | Kurtzman, II et al. |
| 6,151,596 | A | 11/2000 | Hosomi |
| 6,154,738 | A | 11/2000 | Call |
| 6,161,112 | A | 12/2000 | Cragun et al. |
| 6,163,778 | A | 12/2000 | Fogg et al. |
| 6,182,097 | B1 | 1/2001 | Hansen et al. |
| 6,183,366 | B1 | 2/2001 | Goldberg et al. |
| 6,185,614 | B1 | 2/2001 | Cuomo et al. |
| 6,192,380 | B1 | 2/2001 | Light et al. |
| 6,199,079 | B1 | 3/2001 | Gupta et al. |
| 6,208,339 | B1 | 3/2001 | Atlas et al. |
| 6,216,111 | B1 | 4/2001 | Walker et al. |
| 6,216,141 | B1 | 4/2001 | Straub et al. |
| 6,222,520 | B1 | 4/2001 | Gerszberg et al. |
| 6,237,022 | B1 | 5/2001 | Bruck et al. |
| 6,249,284 | B1 | 6/2001 | Bogdan |
| 6,253,188 | B1 | 6/2001 | Witek et al. |
| 6,253,208 | B1 | 6/2001 | Wittgreffe et al. |
| 6,266,058 | B1 | 7/2001 | Meyer |
| 6,269,361 | B1 | 7/2001 | Davis et al. |
| 6,285,987 | B1 | 9/2001 | Roth et al. |
| 6,286,043 | B1 | 9/2001 | Cuomo et al. |
| 6,295,061 | B1 | 9/2001 | Park et al. |
| 6,297,819 | B1 | 10/2001 | Furst |
| 6,304,844 | B1 | 10/2001 | Pan et al. |
| 6,308,202 | B1 | 10/2001 | Cohn et al. |
| 6,311,194 | B1 | 10/2001 | Sheth et al. |
| 6,314,451 | B1 | 11/2001 | Landsman et al. |
| 6,314,457 | B1 | 11/2001 | Schema et al. |
| 6,317,761 | B1 | 11/2001 | Landsman et al. |
| 6,321,209 | B1 | 11/2001 | Pasquali |
| 6,321,256 | B1 | 11/2001 | Himmel et al. |
| 6,324,553 | B1 | 11/2001 | Cragun et al. |
| 6,324,569 | B1 | 11/2001 | Ogilvie et al. |
| 6,324,583 | B1 | 11/2001 | Stevens |
| 6,327,574 | B1 | 12/2001 | Kramer et al. |
| 6,327,617 | B1 | 12/2001 | Fawcett |
| 6,332,127 | B1 | 12/2001 | Bandera |
| 6,334,111 | B1 | 12/2001 | Carrott |
| 6,335,963 | B1 | 1/2002 | Bosco |
| 6,336,131 | B1 | 1/2002 | Wolfe |
| 6,338,059 | B1 | 1/2002 | Fields et al. |
| 6,338,066 | B1 | 1/2002 | Martin et al. |
| 6,341,305 | B2 | 1/2002 | Wolfe |
| 6,347,398 | B1 | 2/2002 | Parthasarathy et al. |
| 6,351,279 | B1 | 2/2002 | Sawyer |
| 6,351,745 | B1 | 2/2002 | Itakura et al. |
| 6,356,898 | B2 | 3/2002 | Cohen et al. |
| 6,356,908 | B1 | 3/2002 | Brown et al. |
| 6,360,221 | B1 | 3/2002 | Gough et al. |
| 6,366,298 | B1 | 4/2002 | Haitsuka |
| 6,370,527 | B1 | 4/2002 | Singhal |
| 6,377,983 | B1 | 4/2002 | Cohen et al. |
| 6,378,075 | B1 | 4/2002 | Goldstein et al. |
| 6,381,742 | B2 | 4/2002 | Forbes et al. |
| 6,385,592 | B1 | 5/2002 | Angles et al. |
| 6,392,668 | B1 | 5/2002 | Murray |
| 6,393,407 | B1 | 5/2002 | Middleton et al. |
| 6,393,415 | B1 | 5/2002 | Getchius et al. |
| 6,397,228 | B1 | 5/2002 | Lamburt et al. |
| 6,401,075 | B1 | 6/2002 | Mason et al. |
| 6,415,322 | B1 | 7/2002 | Jaye |
| 6,418,440 | B1 | 7/2002 | Kuo et al. |
| 6,418,471 | B1 | 7/2002 | Shelton et al. |
| 6,421,675 | B1 | 7/2002 | Ryan et al. |
| 6,421,724 | B1 | 7/2002 | Nickerson et al. |
| 6,434,745 | B1 | 8/2002 | Conley, Jr. et al. |
| 6,438,215 | B1 | 8/2002 | Skladman et al. |

(56) References Cited

U.S. PATENT DOCUMENTS

| | | |
|---|---|---|
| 6,438,578 B1 | 8/2002 | Schmid et al. |
| 6,438,579 B1 | 8/2002 | Hosken |
| 6,442,529 B1 | 8/2002 | Krishan et al. |
| 6,446,128 B1 | 9/2002 | Woods et al. |
| 6,449,657 B2 | 9/2002 | Stanbach, Jr. et al. |
| 6,457,009 B1 | 9/2002 | Bollay |
| 6,459,440 B1 | 10/2002 | Monnes et al. |
| 6,460,036 B1 | 10/2002 | Herz |
| 6,460,042 B1 | 10/2002 | Hitchcock et al. |
| 6,460,060 B1 | 10/2002 | Maddalozzo et al. |
| 6,466,970 B1 | 10/2002 | Lee et al. |
| 6,477,550 B1 | 11/2002 | Balasubramaniam et al. |
| 6,477,575 B1 | 11/2002 | Koeppel et al. |
| 6,480,837 B1 | 11/2002 | Dutta |
| 6,490,722 B1 | 12/2002 | Barton et al. |
| 6,493,702 B1 | 12/2002 | Adar et al. |
| 6,496,931 B1 | 12/2002 | Rajchel et al. |
| 6,502,076 B1 | 12/2002 | Smith |
| 6,513,052 B1 | 1/2003 | Binder |
| 6,513,060 B1 | 1/2003 | Nixon et al. |
| 6,516,312 B1 | 2/2003 | Kraft et al. |
| 6,523,021 B1 | 2/2003 | Monberg et al. |
| 6,529,903 B2 | 3/2003 | Smith et al. |
| 6,539,375 B2 | 3/2003 | Kawasaki |
| 6,539,424 B1 | 3/2003 | Dutta |
| 6,564,202 B1 | 5/2003 | Schuetze et al. |
| 6,567,850 B1 | 5/2003 | Freishtat et al. |
| 6,567,854 B1 | 5/2003 | Olshansky et al. |
| 6,570,595 B2 | 5/2003 | Porter |
| 6,584,492 B1 | 6/2003 | Cezar et al. |
| 6,594,654 B1 | 7/2003 | Salam et al. |
| 6,601,041 B1 | 7/2003 | Brown et al. |
| 6,601,057 B1 | 7/2003 | Underwood et al. |
| 6,601,100 B2 | 7/2003 | Lee et al. |
| 6,604,103 B1 | 8/2003 | Wolfe |
| 6,615,247 B1 | 9/2003 | Murphy |
| 6,631,360 B1 | 10/2003 | Cook |
| 6,642,944 B2 | 11/2003 | Conrad et al. |
| 6,643,696 B2 | 11/2003 | Davis et al. |
| 6,665,656 B1 | 12/2003 | Carter |
| 6,665,838 B1 | 12/2003 | Brown et al. |
| 6,678,866 B1 | 1/2004 | Sugimoto et al. |
| 6,681,223 B1 | 1/2004 | Sundaresan |
| 6,681,247 B1 | 1/2004 | Payton |
| 6,686,931 B1 | 2/2004 | Bodnar |
| 6,687,737 B2 | 2/2004 | Landsman et al. |
| 6,691,106 B1 | 2/2004 | Sathyanarayan |
| 6,694,322 B2 | 2/2004 | Warren et al. |
| 6,697,825 B1 | 2/2004 | Underwood et al. |
| 6,701,362 B1 | 3/2004 | Subramonian |
| 6,701,363 B1 | 3/2004 | Chiu et al. |
| 6,714,975 B1 | 3/2004 | Aggarwal et al. |
| 6,718,365 B1 | 4/2004 | Dutta |
| 6,721,795 B1 | 4/2004 | Eldreth |
| 6,725,269 B1 | 4/2004 | Megiddo |
| 6,741,967 B1 | 5/2004 | Wu et al. |
| 6,748,427 B2 * | 6/2004 | Drosset et al. ............... 709/219 |
| 6,757,661 B1 | 6/2004 | Blaser et al. |
| 6,760,746 B1 | 7/2004 | Schneider |
| 6,763,379 B1 | 7/2004 | Shuster |
| 6,763,386 B2 | 7/2004 | Davis et al. |
| 6,771,290 B1 | 8/2004 | Hoyle |
| 6,772,200 B1 | 8/2004 | Bakshi et al. |
| 6,785,659 B1 | 8/2004 | Landsman et al. |
| 6,785,723 B1 | 8/2004 | Genty et al. |
| 6,801,906 B1 | 10/2004 | Bates et al. |
| 6,826,534 B1 | 11/2004 | Gupta et al. |
| 6,826,546 B1 | 11/2004 | Shuster |
| 6,827,669 B2 | 12/2004 | Cohen et al. |
| 6,847,969 B1 | 1/2005 | Mathai et al. |
| 6,847,992 B1 | 1/2005 | Haitsuka et al. |
| 6,848,004 B1 | 1/2005 | Chang et al. |
| 6,850,967 B1 | 2/2005 | Spencer et al. |
| 6,853,982 B2 | 2/2005 | Smith et al. |
| 6,857,024 B1 | 2/2005 | Chen et al. |
| 6,874,018 B2 | 3/2005 | Wu |
| 6,877,027 B1 | 4/2005 | Spencer et al. |
| 6,880,123 B1 | 4/2005 | Landsman |
| 6,882,981 B2 | 4/2005 | Philippe et al. |
| 6,892,181 B1 | 5/2005 | Megiddo et al. |
| 6,892,223 B1 | 5/2005 | Kawabata et al. |
| 6,892,354 B1 | 5/2005 | Servan-Schreiber et al. |
| 6,904,408 B1 | 6/2005 | McCarthy et al. |
| 6,910,179 B1 | 6/2005 | Pennell et al. |
| 6,957,390 B2 * | 10/2005 | Tamir et al. ................... 715/744 |
| 6,958,759 B2 | 10/2005 | Safadi et al. |
| 6,968,507 B2 | 11/2005 | Pennell et al. |
| 6,973,478 B1 | 12/2005 | Ketonen et al. |
| 6,976,053 B1 | 12/2005 | Tripp et al. |
| 6,976,090 B2 | 12/2005 | Ben-Shaul et al. |
| 7,039,599 B2 | 5/2006 | Merriman et al. |
| 7,043,526 B1 | 5/2006 | Wolfe |
| 7,054,900 B1 | 5/2006 | Goldston |
| 7,076,546 B1 | 7/2006 | Bates et al. |
| 7,085,682 B1 | 8/2006 | Heller et al. |
| 7,100,111 B2 | 8/2006 | McElfresh et al. |
| 7,111,010 B2 * | 9/2006 | Chen ............................. 707/102 |
| 7,136,875 B2 | 11/2006 | Anderson et al. |
| 7,162,739 B2 | 1/2007 | Cowden et al. |
| 7,181,415 B2 | 2/2007 | Blaser et al. |
| 7,283,992 B2 | 10/2007 | Liu et al. |
| 7,346,606 B2 | 3/2008 | Bharat |
| 7,349,827 B1 | 3/2008 | Heller et al. |
| 7,363,291 B1 | 4/2008 | Page |
| 7,421,432 B1 | 9/2008 | Hoelzle et al. |
| 7,512,603 B1 | 3/2009 | Veteska et al. |
| 7,610,213 B2 | 10/2009 | Jones et al. |
| 7,716,173 B2 * | 5/2010 | Stolte et al. .................. 707/600 |
| 7,844,488 B2 | 11/2010 | Merriman et al. |
| 2001/0030970 A1 | 10/2001 | Wiryaman et al. |
| 2001/0037240 A1 | 11/2001 | Marks et al. |
| 2001/0037325 A1 | 11/2001 | Biderman et al. |
| 2001/0037488 A1 | 11/2001 | Lee |
| 2001/0044795 A1 | 11/2001 | Cohen et al. |
| 2001/0049320 A1 | 12/2001 | Cohen et al. |
| 2001/0049321 A1 | 12/2001 | Cohen et al. |
| 2001/0049620 A1 | 12/2001 | Blasko |
| 2001/0049716 A1 | 12/2001 | Wolfe |
| 2001/0051559 A1 | 12/2001 | Cohen et al. |
| 2001/0053735 A1 | 12/2001 | Cohen et al. |
| 2001/0054020 A1 | 12/2001 | Barth et al. |
| 2002/0002538 A1 | 1/2002 | Ling |
| 2002/0004754 A1 | 1/2002 | Gardenswartz |
| 2002/0007307 A1 | 1/2002 | Miller |
| 2002/0007309 A1 | 1/2002 | Reynar |
| 2002/0010626 A1 | 1/2002 | Agmoni |
| 2002/0016736 A1 | 2/2002 | Cannon et al. |
| 2002/0019834 A1 | 2/2002 | Vilcauskas, Jr. et al. |
| 2002/0023159 A1 | 2/2002 | Vange et al. |
| 2002/0032592 A1 | 3/2002 | Krasnick et al. |
| 2002/0038363 A1 | 3/2002 | MacLean |
| 2002/0042750 A1 | 4/2002 | Morrison |
| 2002/0046099 A1 | 4/2002 | Frengut et al. |
| 2002/0049633 A1 | 4/2002 | Pasquali |
| 2002/0052785 A1 | 5/2002 | Tenenbaum |
| 2002/0052925 A1 | 5/2002 | Kim et al. |
| 2002/0055912 A1 | 5/2002 | Buck |
| 2002/0059094 A1 | 5/2002 | Hosea et al. |
| 2002/0059099 A1 | 5/2002 | Coletta |
| 2002/0065802 A1 | 5/2002 | Uchiyama |
| 2002/0068500 A1 | 6/2002 | Gabai et al. |
| 2002/0069105 A1 | 6/2002 | do Rosario Botelho et al. |
| 2002/0077219 A1 | 6/2002 | Cohen et al. |
| 2002/0078076 A1 | 6/2002 | Evans |
| 2002/0078192 A1 | 6/2002 | Kopsell et al. |
| 2002/0091700 A1 | 7/2002 | Steele et al. |
| 2002/0094868 A1 | 7/2002 | Tuck et al. |
| 2002/0099605 A1 | 7/2002 | Weitzman et al. |
| 2002/0099824 A1 | 7/2002 | Bender et al. |
| 2002/0107847 A1 | 8/2002 | Johnson |
| 2002/0111910 A1 | 8/2002 | Walsh |
| 2002/0111994 A1 | 8/2002 | Raghunandan |
| 2002/0112035 A1 | 8/2002 | Carey et al. |
| 2002/0112048 A1 | 8/2002 | Gruyer et al. |

(56) References Cited

U.S. PATENT DOCUMENTS

| | | |
|---|---|---|
| 2002/0116494 A1 | 8/2002 | Kocol |
| 2002/0120648 A1 | 8/2002 | Ball et al. |
| 2002/0122065 A1 | 9/2002 | Segal et al. |
| 2002/0123912 A1 | 9/2002 | Subramanian et al. |
| 2002/0128904 A1 | 9/2002 | Carruthers et al. |
| 2002/0128925 A1 | 9/2002 | Angeles |
| 2002/0152121 A1 | 10/2002 | Hiroshi |
| 2002/0152222 A1 | 10/2002 | Holbrook |
| 2002/0154163 A1 | 10/2002 | Melchner |
| 2002/0156781 A1 | 10/2002 | Cordray et al. |
| 2002/0156812 A1 | 10/2002 | Krasnoiarov et al. |
| 2002/0169670 A1 | 11/2002 | Barsade et al. |
| 2002/0169762 A1 | 11/2002 | Cardona |
| 2002/0171682 A1 | 11/2002 | Frank et al. |
| 2002/0175947 A1 | 11/2002 | Conrad et al. |
| 2002/0194151 A1 | 12/2002 | Fenton et al. |
| 2003/0005067 A1 | 1/2003 | Martin et al. |
| 2003/0005134 A1 | 1/2003 | Martin et al. |
| 2003/0014399 A1 | 1/2003 | Hansen et al. |
| 2003/0018778 A1 | 1/2003 | Martin et al. |
| 2003/0023481 A1 | 1/2003 | Calvert et al. |
| 2003/0023698 A1 | 1/2003 | Dieberger et al. |
| 2003/0028870 A1 | 2/2003 | Weisman et al. |
| 2003/0032409 A1 | 2/2003 | Hutcheson et al. |
| 2003/0033155 A1 | 2/2003 | Peerson et al. |
| 2003/0041050 A1 | 2/2003 | Smith et al. |
| 2003/0046150 A1 | 3/2003 | Ader et al. |
| 2003/0050863 A1 | 3/2003 | Radwin |
| 2003/0088554 A1 | 5/2003 | Ryan et al. |
| 2003/0105589 A1 | 6/2003 | Liu et al. |
| 2003/0110080 A1 | 6/2003 | Tsutani et al. |
| 2003/0120593 A1 | 6/2003 | Bansal et al. |
| 2003/0120654 A1 | 6/2003 | Edlund et al. |
| 2003/0131100 A1 | 7/2003 | Godon et al. |
| 2003/0135490 A1 | 7/2003 | Barrett et al. |
| 2003/0154168 A1 | 8/2003 | Lautenbacher |
| 2003/0171990 A1 | 9/2003 | Rao et al. |
| 2003/0172075 A1 | 9/2003 | Reisman |
| 2003/0195877 A1 | 10/2003 | Ford et al. |
| 2003/0208472 A1 | 11/2003 | Pham |
| 2003/0221167 A1 | 11/2003 | Goldstein et al. |
| 2004/0002896 A1 | 1/2004 | Alanen et al. |
| 2004/0024756 A1 | 2/2004 | Rickard |
| 2004/0068486 A1 | 4/2004 | Chidlovskii |
| 2004/0073485 A1 | 4/2004 | Liu et al. |
| 2004/0078294 A1 | 4/2004 | Rollins et al. |
| 2004/0095376 A1 | 5/2004 | Graham et al. |
| 2004/0098229 A1 | 5/2004 | Error et al. |
| 2004/0098449 A1 | 5/2004 | Bar-Lavi et al. |
| 2004/0133845 A1 | 7/2004 | Forstall et al. |
| 2004/0163101 A1 | 8/2004 | Swix et al. |
| 2004/0167926 A1 | 8/2004 | Waxman et al. |
| 2004/0167928 A1 | 8/2004 | Anderson et al. |
| 2004/0181525 A1 | 9/2004 | Itzhak et al. |
| 2004/0193488 A1 | 9/2004 | Khoo et al. |
| 2004/0225716 A1 | 11/2004 | Shamir et al. |
| 2004/0247748 A1 | 12/2004 | Bronkema |
| 2004/0249709 A1 | 12/2004 | Donovan et al. |
| 2004/0249938 A1 | 12/2004 | Bunch |
| 2004/0267723 A1 | 12/2004 | Bharat |
| 2005/0015366 A1 | 1/2005 | Carrasco et al. |
| 2005/0021397 A1 | 1/2005 | Cui et al. |
| 2005/0027822 A1 | 2/2005 | Plaza |
| 2005/0033657 A1 | 2/2005 | Herrington et al. |
| 2005/0080772 A1 | 4/2005 | Bem |
| 2005/0091106 A1 | 4/2005 | Reller et al. |
| 2005/0091111 A1 | 4/2005 | Green et al. |
| 2005/0097088 A1 | 5/2005 | Bennett et al. |
| 2005/0102202 A1 | 5/2005 | Linden et al. |
| 2005/0131762 A1 | 6/2005 | Bharat et al. |
| 2005/0149404 A1 | 7/2005 | Barnett et al. |
| 2005/0182773 A1 | 8/2005 | Feinsmith |
| 2005/0187823 A1 | 8/2005 | Howes |
| 2005/0216572 A1 | 9/2005 | Tso et al. |
| 2005/0222901 A1 | 10/2005 | Agarwal et al. |
| 2005/0222982 A1 | 10/2005 | Paczkowski et al. |
| 2005/0273463 A1 | 12/2005 | Zohar et al. |
| 2006/0015390 A1 | 1/2006 | Rijsinghani et al. |
| 2006/0031253 A1 | 2/2006 | Newbold et al. |
| 2006/0136524 A1 | 6/2006 | Wohlers et al. |

FOREIGN PATENT DOCUMENTS

| | | |
|---|---|---|
| EP | 1207468 | 5/2002 |
| JP | 2002073545 | 3/2002 |
| WO | WO 99/38321 | 7/1999 |
| WO | WO 99/44159 | 9/1999 |
| WO | WO 99/46701 | 9/1999 |
| WO | WO 99/55066 | 10/1999 |
| WO | WO 00/04434 | 1/2000 |
| WO | WO 00/54201 | 9/2000 |
| WO | WO 01/03028 | 1/2001 |
| WO | WO 01/15052 | 3/2001 |
| WO | WO 01/39024 A2 | 5/2001 |
| WO | WO 01/44992 | 6/2001 |
| WO | WO 01/63472 | 8/2001 |
| WO | WO 01/69929 | 9/2001 |
| WO | WO 01/90917 | 11/2001 |
| WO | WO 03/010685 | 2/2003 |

OTHER PUBLICATIONS

Cafasso, Rosemary; "Multidimensional DB on Comeback Trail", Dialog(R)File 15: ABI/Inform(R), #00936299 Computerworld v28n43 pp. 69, Oct. 24, 1994, 3 pages.

ACM Portal USPTO Search, "Communications of the ACM: vol. 52, Issue 1", Association for Computing Machinery, dated Jan. 2009, 1 page.

Ad Close, Webpage [online]. C/net Downloads.com [retrieved on Oct. 4, 2001]. Retrieved from the Internet <URL http//download.cnet.com/downloads/0-10059-100-915154.html>.

Ad Muncher, Webpage [online]. C/net Downloads.com [retrieved on Oct. 4, 2001]. Retrieved from the Internet <URL:http//download.cnet.com/downloads/0-33567-18-100-2750044.html>.

AdDelete, Webpage [online]. C/net Download.com [retrieved on Oct. 4, 2001]. Retrieved from the Internet <URL:http//download.cnet.com/downloads/0-10059-100-7003126.html>.

Adextinguisher—Introduction and News Sections. Webpage [online][retrieved on Oct. 4, 2001]. Retrieved from the Internet URL:http//adext.magenet.net.html.

AdPurger, Webpage [online]. C/net Downloads.com [retrieved on Oct. 4, 2001]. Retrieved from the Internet <URL:http//download.cnet.com/downloads/0-10068-100-5067717.html>.

AdsOff, Webpage [online]. C/net Downloads.com [retrieved on Oct. 3, 2001]. Retrieved from the Internet <URL:http//download.cnet.com/downloads/0-10059-100-9 12651.html>.

AdSubract SE, Webpage [online]. C/net Downloads.com [retrieved on Oct. 4, 2001]. Retrieved from the Internet <URL:http//download.cnet.com/downloads/0-3356727-100-5963713.html>.

Advertising Killer, Webpage [online]. C/net Downloads.com [retrieved on Oct. 3, 2001]. Retrieved from the Internet <URL.http//download.cnet.com/downloads/0-10059-100-1539520.html>.

Advisory Action dated Nov. 19, 2008 issued in U.S. Appl. No. 11/015,583, 3 pages.

Aggarwal, Charu C. et al. 2001. Intelligent Crawling on the World Wide Web with Arbitrary Predicates. ACM, pp. 96-105.

AllGone, Webpage [online]. C/net Downloads.com [retrieved on Oct. 4, 2001]. Retrieved from the Internet <URL:http//download.cnet.com/downloads/0-10068-100-2915974.html>.

AnalogX Pow, Webpage [online]. C/net Downloads.com [retrieved on Oct. 3, 2001]. Retrieved from the Internet <URL:http//download.cnet com/downloads-0-3356748-100-915372.html>.

Bae, Sung Min, et al., "Fuzzy Web Ad Selector", IEEE Intelligent Systems, vol. 18 Issue 6, Nov./Dec. 2003, pp. 62-69.

Banner Zapper, Webpage [online]. C/net Downloads.com [retrieved on Oct. 4, 2001]. Retrieved from the Internet <URL:http//download.cnet.com/downloads/0-3356727-100-6384611.html>.

BanPopup, Webpage [online]. C/net Downloads.com [retrieved on Oct. 4, 2001]. Retrieved from the Internet <URL:http//download.cnet.com/downloads/0-10059-100-6901908.html>.

(56) References Cited

OTHER PUBLICATIONS

Black List. Webpage [online]. C/net Downloads.com [retrieved on Oct. 4, 2001]. Retrieved from the Internet <URL.http/download cnet.com/downloads/0-10059-100-902347 html>.

Broder, Alan J., "Data Mining the Internet and Privacy", WEBKDD '99, LNAI 1836, Springer-Verlag, Berlin, Germany, (c) 2000, pp. 56-73.

Bucklin, Randolph E., et al., "Choice and the Internet: From Clickstream to Research Stream", Marketing Letters, vol. 13, No. 3, Aug. 2002, pp. 245-258.

Claria—Company Information—Corporate Review, webpage [online], retrieved on Mar. 3, 2005, retrieved from the Internet: <URL:http://www.claria.com/companyinfo.html>.

Close Popup 4.0, Webpage [online]. Take a Hike Software [retrieved on Oct. 4, 2001]. Retrieved from the Internet <URL:http//www.ryanware.com/close_popup.html>.

Close Popup, Webpage [online]. C/net Downloads.com [retrieved on Oct. 4, 2001]. Retrieved from the Internet <URL:http//download.cnet.com/downloads/0-10059-100-905799.html>.

CobraSoft PopStop, Webpage (online). C/net Downloads.com [retrieved on Oct. 4, 2001]. Retrieved from the Internet <URL:http//download cnet.com/downloads/0-10058-100-6926765.html>.

Compare Prices and Read Reviews on AdsOff! Epenions.com. Webpage [online]; Jan. 21, 2001. Obtained from corresponding International Application PCT Search Report.

Copernic, Copernic: Software to Search, Find, and Manage Information, Copernic Technologies, Inc. 2004, 2 pgs. (retrieved on Apr. 6, 2004). Retrieved from the Internet<URL:http://www.copernic.com/en/index.html>.

CrushPop 2000, Webpage [online]. www.32bit.com [retrieved on Oct. 4, 2001]. Retrieved from the Internet <URL.http//32bit.com/software/listings/Internet/Special/180P/13794.html>.

Definition of "close button", Microsoft Press Computer Dictionary, 3rd ed. (Redmond WA: Microsoft Press, 1997).

Diligenti, Michelangelo et al. 2004. A Unified Probalistic Framework for Web Page Scoring Systems. IEEE, vol. 16, No. 1. Jan. 2004, pp. 4-16.

Directive 2002/58/EC of the European Parliament and of the Council of Jul. 12, 2002 concerning the processing of personal data and the protection of privacy in the electronic communications sector (Directive on privacy and electronic communications), Official Journal L 201, Jul. 31, 2002 p. 0037-0047 (downloaded.

Dogpile, Dogpile Web Search Home Page, InfoSpace, Inc. 2004, p. 1 of 1, (retrieved on Apr. 1, 2004). Retrieved from the Internet: <URL:http://www.dogpile.com.html>.

DoubleClick products (17 total pgs); Webpage [online] [retrieved on Jun. 11, 2003]; Retrieved from the Internet: <URL: http://www.doubleclick.com>.

Eick, Stephen G., "Visual Analysis of Website Browsing Patterns", Visual Interfaces to Digital Libraries, Springer-Verlag, Berlin, Germany, (c) 2002, pp. 65-77.

Eirinaki, Magdalini, et al., "Web Mining for Web Personalization", ACM Transactions on Internet Technology (TOIT), vol. 3, Issue 1, Feb. 2003, pp. 1-27.

Favela, Jesus, et al. 1997. Image-Retrieval Agent: Integrating Image Content and Text. IEE, vol. 1.14, pp. 36-39.

Fenstermacher, Kurt D., et al., "Client-Side Monitoring for Web Mining", Journal of the American Society for Information Science and Technology, vol. 54, Issue 7, May 2003, pp. 625-637.

Fenstermacher, Kurt D., et al., "Mining Client-Side Activity for Personalization", WECWIS 2002, (c) 2002, pp. 205-212.

Final Office Action dated Mar. 26, 2010 issued in U.S. Appl. No. 11/207,590, 8 pages.

Final Rejection dated May 21, 2008 issued in U.S. Appl. No. 11/015,583, 8 pages.

Friedman, Batya, et al., "Informed Consent in the Mozilla Browser: Implementing Value-Sensitive Design", HICSS-35 '02, Jan. 2002, pp. 10-19.

Fu, Xiaobin, et al., "Mining Navigation History for Recommendation", IUI 2000, New Orleans, LA, (c) 2000, pp. 106-112.

Google search for "define: close button", Mar. 2, 2007.

Google Search, "Result Search Query Build Search Engine Index Using Gather Consumer Navigate Search", http://scholar.google.com/scholar, dated Apr. 7, 2010, 3 pages.

Gralla, Preston, How the Internet Works, Special Edition, Ziff-Davis Press, Emeryville, CA, .(c) 1997, pp. 254 and 266-271.

Greening, Dan R., "Tracking Users: What Marketers Really Want to Know", Web Techniques, Jul. 1999, downloaded from: www.webtechniques.com/archives/1999/07/, pp. 1-9.

Heller, Laura, "Target gets mod in Manhattan", DSNRetailing Today, v40 No. 16, Aug. 20, 2001: 2, 37.

Hongyu Liu et al., "Focused Crawling by Learning HMM from User's Topic-Specific Browsing" Proceedings of the IEEE/WIC/ACM International Conference on Web Intelligence (WI '04) 0-7695-2100-2/04.

Hun, Ke et al. 2003. A Probabilistic Model for Intelligent Web Crawlers. IEEE, pp. 278-282.

InterMute, Webpage [online]. C/net Downloads.com [retrieved on Oct. 3, 2001]. Retrieved from the Internet <URL:http//download.cnet.com/downloads/0-10059-100-906599.html>.

International Search Report and Written Opinion of the International Search Authority for Intl. Appl. No. PCT/US05/45722 mailed Jan. 19, 2007.

International Search Report in EP Appln. No. 05802579.2-1527, dated May 2, 2008.

International Search Report in PCT Appln. No. PCT/US04/09918, mailed Mar. 10, 2005 [3 pages].

International Search Report in PCT Appln. No. PCT/US2004/07714, mailed Mar. 31, 2005 [1 page].

Internet Citation: "Gator.com offers one-click shopping at over 5,000 e-commerce site today"; Jun. 14, 1999; XP002145278; Date retrieved: Jun. 28, 2001. URL:http://www.gator.com/company/press/pr061499b.html.

Ishitani, Lucila, et al., "Masks: Bringing Anonymity and Personalization Together", IEEE Security & Privacy, vol. 1, Issue 3, May/Jun. 2003, pp. 18-23.

Kiyomitsu, Hidenari, et al., "Web Reconfiguration by Spatio-Temporal Page Personalization Rules Based on Access Histories", Applications and the Internet, San Diego, CA, Jan. 8-12, 2001, pp. 75-82.

Klemm, Reinhard P., "WebCompanion: A Friendly Client-Side Web Prefetching Agent", IEEE Transactions on Knowledge and Data Engineering, vol. 11, No. 4, Jul./Aug. 1999, pp. 577-594.

Kourbatov, Opening a Window, Jul. 8, 2000, plublished by www.javascripter.net, whole document.

Langheinrich, M., et al. "Unintrusive Customization Techniques for Web Advertising," NEC Corporation, C&C Media Research Laboratories, Kanagawa, Japan, Computer Networks, vol. 31, No. 11, pp. 1259-1272, May 1999 (in Conf. Proc. 8th Int'l WWW Conf., Toronto, Canada, May 11-14, 1999).

Lee, Ching-Cheng, et al., "Category-Based Web Personalization System", COMPSAC 2001, Oct. 8-12, 2001, pp. 621-625.

Leuski, Anton et al. 2000. Lighthouse: Showing the Way to Relevant Information. IEEE, Oct. 2000, pp. 125-129.

Liu, Jian-Guo, et al., "Web Mining for Electronic Business Application", PDCAT 2003, Aug. 27-29, 2003, pp. 872-876.

Liu, Jian-Guo, et al., "Web Usage Mining for Electronic Business Applications", Machine Learning and Cybernetics, Shanghai, China, Aug. 2004, pp. 1314-1318.

Lu, Hongjun, et al., "Extending a Web Browser with Client-Side Mining", APWeb 2003, LNCS 2642, Springer-Verlag, Berlin, Germany, (c) 2003, pp. 166-177.

Luxenburger, Julia, et al., "Query-Log Based Authority Analysis for Web Information Search", WISE 2004, LNCS 3306, Springer-Verlag, Berlin, Germany, Nov. 1, 2004, pp. 90-101.

Marcebra Net, Webpage [online]. C/net Downloads.com [retrieved on Oct. 4, 2001]. Retrieved from the Internet <URL:http//download.cnet.com/downloads/0-3364666-100-5210875.html>.

Metacrawler, Web Search Home Page—MetaCrawler, InfoSpace, Inc. 2004, p. 1 of 1 (retrieved on Apr. 6, 2004), Retrieved from the internet: <URL:http://www.metacrawler.com.html>.

Mobasher, Bamshad, et al., "Automatic Personalization Based on Web Usage Mining", Communications of the ACM, vol. 43, Issue 8, Aug. 2000, pp. 142-151.

(56) References Cited

OTHER PUBLICATIONS

Mr. KillAd. Webpage [online]. C/net Downloads.com [retrieved on Oct. 4, 2001]. Retrieved from the Internet <URL:http//download.cnet.com/downloads/0-10059-100-895339 html>.
Nagger, Webpage [online]. C/net Downloads.com [retrieved on Oct. 4, 2001]. Retrieved from the Internet <URL:http//download.cnet.com/downloads/0-3356748-100-2497932 html>.
NoAds 2000.6.30.1, Webpage [online] south bay software [retrieved on Oct. 4, 2001]. Retrieved from the Internet <URL:http//www.southbaypc.com/NoAds.html>.
Non-Final Rejection dated Dec. 20, 2006 issued in U.S. Appl. No. 11/015,583, 8 pages.
Non-Final Rejection dated Jul. 20, 2009 issued in U.S. Appl. No. 11/015,583, 7 pages.
NoPops 1.1, Webpage [online]. WebAttack.com [retrieved on Oct. 4, 2001]. Retrieved from the Internet <URL:http//www.webattack.com/get/nopops.shtml>.
Office Action mailed Oct. 10, 2007 from U.S. Appl. No. 11/207,590, filed Aug. 19, 2005.
Office Action mailed Sep. 13, 2006 from U.S. Appl. No. 10/700,820, filed Nov. 4, 2003.
Office Action mailed Oct. 16, 2008 from U.S. Appl. No. 11/207,590, filed Aug. 19, 2005.
Office Action mailed Sep. 16, 2004 from U.S. Appl. No. 10/056,932, filed Jan. 25, 2002.
Office Action mailed Mar. 18, 2005 from U.S. Appl. No. 10/056,932, filed Jan. 25, 2002.
Office Action mailed Jun. 22, 2009 from U.S. Appl. No. 11/207,590, filed Aug. 19, 2005.
Office Action mailed May 24, 2007 from U.S. Appl. No. 10/700,820, filed Nov. 4, 2003.
Office Action mailed Apr. 25, 2006 from U.S. Appl. No. 10/700,820, filed Nov. 4, 2003.
Office Action mailed Dec. 26, 2006 from U.S. Appl. No. 10/700,820, filed Nov. 4, 2003.
Office Action mailed Jul. 27, 2005 from U.S. Appl. No. 10/056,932, filed Jan. 25, 2002.
Office Action mailed Sep. 5, 2003 from U.S. Appl. No. 10/056,932, filed Jan. 25, 2002.
Office Action mailed May 7, 2004 from U.S. Appl. No. 10/056,932, filed Jan. 25, 2002.
Office Action mailed Oct. 19, 2007 from U.S. Appl. No. 11/207,589, filed Aug. 19, 2005.
Paepcke, Andreas, et al., "Beyond Document Similarity: Understanding Value-Based Search and Browsing Technologies", ACM SIGMOD Record, vol. 29, Issue 1, Mar. 2000, pp. 80-92.
Paganelli, Laila, et al., "Intelligent Analysis of User Interactions with Web Applications", IUI '02, San Francisco, CA, Jan. 13-16, 2002, pp. 111-118.
Paraben's AdStopper, Webpage [online]. C/net Downloads.com [retrieved on Oct. 4, 2001]. Retrieved from the Internet <URL:http//download.cnet.com/downloads/0-10059-100-2643648.html>.
Park, Joon S., et al., "Secure Cookies on the Web", IEEE Internet Computing, vol. 4, Issue 4, Jul./Aug. 2000, pp. 36-44.
Payton, D., et al. 1999. Dynamic collaborator discovery in information intensive environments. ACM Comput. Surv. 31, 2es, Article 8 (Jun. 1999), pp. 1-8.
PCT International Search Report for application No. PCT/US02/35981, 3 sheets; mailed Apr. 4, 2003.
PCT International Search Report for PCT/US03/13985 mailed Aug. 8, 2003; total of 1 sheet.
PCT International Search Report re: International Application No. PCT/US05/29615 dated Feb. 20, 2006.
Pierrakos, Dimitrios, et al., "Web Usage Mining as a Tool for Personalization: A Survey", User Modeling and User-Adapted Interaction, vol. 13, No. 4, (c) 2003, pp. 311-372.
Pierre Maret, et al.; Multimedia Information Interchange: Web Forms Meet Data Servers; Proceedings of the IEEE International Conference on Multimedia Computing and Systems; vol. 2, Jun. 7-11, 1999, pp. 499-505; XP000964627; Florence, Italy.
Popki Popup Closer 1.4, Webpage [online]. WebAttack.com [retrieved on Oct. 4, 2001]. Retrieved from the Internet <URL:http//www.webattack.com/get/popki.shtml>.
PopKill, Webpage [online]. C/net Downloads.com [retrieved on Oct. 4, 2001]. Retrieved from the Internet <URL:http//download.cnet.com/downloads/0-10059-100-6967054.html>.
PopNot, Webpage [online]. C/net Downloads.com [retrieved on Oct. 4, 2001]. Retrieved from the Internet <URL http//download.cnet.com/downloads/0-10059-100-5112702.html>.
PopUp Eraser, Webpage [online]. C/net Downloads.com [retrieved on Oct. 4, 2001]. Retrieved from the Internet <URL:http//download.cnet.com/downloads/0-10059-100-6322841.html>.
Popup Hunter, Webpage [online]. C/net Downloads.com [retrieved on Oct. 4, 2001]. Retrieved from the Internet <URL:http//download.cnet.com/downloads/0-10059-100-1451171.html>.
PopUp Killer, Webpage [online]. C/net Downloads.com [retrieved on Oct. 3, 2001]. Retrieved from the Internet <URL.http//download.cnet.com/downloads/0-10059-100-7253644 html>.
Popup Smasher, Webpage [online]. C/net Downloads.com [retrieved on Oct. 4, 2001]. Retrieved from the Internet <URL:http/download.cnet.com/downloads/0-3364664-100-7209048.html>.
Pop-up stopper, Webpage [online]. C/net Downloads.com [retrieved on Oct. 3, 2001]. Retrieved from the Internet <URL:http//download.cnet.com/downloads/0-10059-100-6803957.sub.-html&-gt;.
PopupDummy, Webpage [online]. C/net Downloads.com [retrieved on Oct. 4, 2001]. Retrieved from the Internet <URL:http//download.cnet.com/downloads/0-10059-100-6943327.html>.
Privacy and Electronic Communications (EC Directive) Regulations 2003 (PECR), No. 2426, Electronic Communication, Sep. 2003.
Ready, Kevin et al., "Plug-n-Play Java Script" (Indianapolis, IN: New Riders Publishing, 1996): 19-22, 39, 40 and 43-45.
Restriction Requirement dated Oct. 31, 2007 issued in U.S. Appl. No. 11/015,583, 6 pages.
Schonberg, Edith, et al., "Measuring Success", Communications of the ACM, vol. 43, Issue 8, Aug. 2000, pp. 53-57.
Shahabi, Cyrus, et al., "Efficient and Anonymous Web-Usage Mining for Web Personalization", INFORMS Journal on Computing, vol. 15, No. 2, Spring 2003, pp. 123-148.
Shopping with WhenUShop, Webpage [on-line]; WhenU.com [retrieved on Mar. 19, 2002]. Retrieved from the Internet: URL:http://www.whenu.com.
SideStep, The Traveler's Search Engine; Webpage (online) (retrieved on Oct. 7, 2004); retrieved from the Internet: <URL:http://www.sidestep.com/main.html.
Soumen Chakrabarti et al., "Focused Crawling: A New Approach to Top-Specific Web Resource Discovery" Computer Networks 31 (1999), pp. 1623-1640.
Srivastava, Jaideep, et al., "Web Usage Mining: Discovery and Applications of Usage Patterns from Web Data", SIGKDD Explorations, vol. 1. Issue 2, Jan. 2000, pp. 12-23.
Surf in Peace 2.01, Webpage [online]. WebAttack.com [retrieved on Oct. 4, 2001]. Retrieved from the Internet <URL:http//www.webattack.com/get/sip.shtml>.
U.S. Appl. No. 09/993,887, filed Nov. 27, 2001, by Jax B. Cowden, et al.
U.S. Appl. No. 09/993,904, filed Nov. 27, 2001, by Jax B. Cowden, et al.
U.S. Appl. No. 09/993,906, filed Nov. 27, 2001, by Jax B. Cowden, et al.
U.S. Appl. No. 11/207,590—Jul. 5, 2011 PTO Office Action.
U.S. Appl. No. 11/427,243—May 10, 2011 PTO Office Action.
U.S. Appl. No. 12/577,702—Aug. 15, 2011 PTO Office Action.
Uehara, Satoru, et al., "An Implementation of Electronic Shopping Cart on the Web System Using component-Object Technology", Proc. of the 6th International Conf./ on Object-Oriented Real-Time Dependable Systems, Jan. 8-10, 2001, pp. 77-84.
Ultraseek Server Detailed Feature List, http://software.infoseek.com/products/ultraseek/ultrafeatures.htm, Accessed from Apr. 1998 archive from http://web.archive.org/web/19980419092128/http://software.infoseek.com/products/.
U.S. Appl. No. 09/993,888, filed Nov. 27, 2001, by Mark E. Pennell, et al.

(56) References Cited

OTHER PUBLICATIONS

Visual Search ToolBar—Graphically Enhance Search Results, 2004 Viewpoint Corporation; Webpage [online] [retrieved on Oct. 7, 2004]; retrieved from the Internet: <URL:http://www.viewpoint.com/pub/toolbar/download.html.

Web Magician, Webpage [online]. RocketDownLoad.com [retrieved on Oct. 4, 2001]. Retrieved from the Internet <URL:http/www.rocketdownload.com/Details/Inte/webmag.html>.

Wenyin, Liu, et al., "Ubiquitous Media Agents: A Framework for Managing Personally Accumulated Multimedia Files", Multimedia Systems, vol. 9, No. 2, Aug. 2003, pp. 144-156.

www.conversionruler.com/faq.php, Feb. 4, 2003.

Xu, Cheng-Zhong, et al., "A Keyword-Based Semantic Prefetching Approach in Internet News Services", IEEE Transactions on Knowledge and Data Engineering, vol. 16, Issue 5, May 2004, pp. 601-611.

Zaiane, Osmar R., et al., "Discovering Web Access Patterns and Trends by Applying OLAP and Data Mining Technology on Web Logs", IEEE International Forum on Research and Technology Advances in Digital Libraries, Santa Barbara, CA, Apr. 22-24, 1998, pp. 19-29.

Zero Popup, Webpage [online]. C/net Downloads.com [retrieved on Oct. 4, 2001]. Retrieved from the Internet <URL:http//download.cnet.com/downloads/0-3356748-100-7163307.html>.

* cited by examiner

SYSTEM FOR DATABASE REPORTING

RELATED APPLICATION

This application is related to U.S. patent application Ser. No. 10/721,117, entitled "Database Structure and Front End," naming Dominic Bennett and Dan Hu as inventors, filed on Nov. 25, 2003 (the "Bennett Disclosure"). That application is concurrently owned by the assignee hereof.

BACKGROUND OF THE INVENTION

The present invention relates to database employment and management. In particular, it relates to report generation and use in a client-server OLAP environment.

A problem with current database reporting systems is the inability of large-scale database systems to accommodate multiple reports on a client system. Reports in OLAP systems can be large and cumbersome, requiring considerable time to run, even on speedy systems, and considerable data storage resources when they are completed. Storage of multiple datasets used in the reporting process is generally not possible.

Further, as a corollary of that fact, users cannot run multiple reports simultaneously. That limitation poses particular problems to analysts who need to look at data from a number of viewpoints, requiring multiple reports.

The art has not approached these issues, creating a need that has remained unmet until the event of the invention claimed herein.

SUMMARY OF THE INVENTION

An aspect of the invention is a method of creating user-generated reports. The method begins with the step of receiving information related to consumer internet behavior. That information is then assembled into a database having facts and dimensions, in which the database resides on a server, the server being connected to a communications network. The method then provides a report generation system, including a report generation module resident on the server. The module generates a report, beginning with accepting user criteria for generating a report from a front end system resident on a client computer. It then generates from the database a dataset corresponding to the first report and forwards the same to the client computer, and it displays the report generated from the first dataset. The module then reiterates the report generation steps to generate a second report, the first report remaining resident on the client computer.

DETAILED DESCRIPTION

Figure 1:
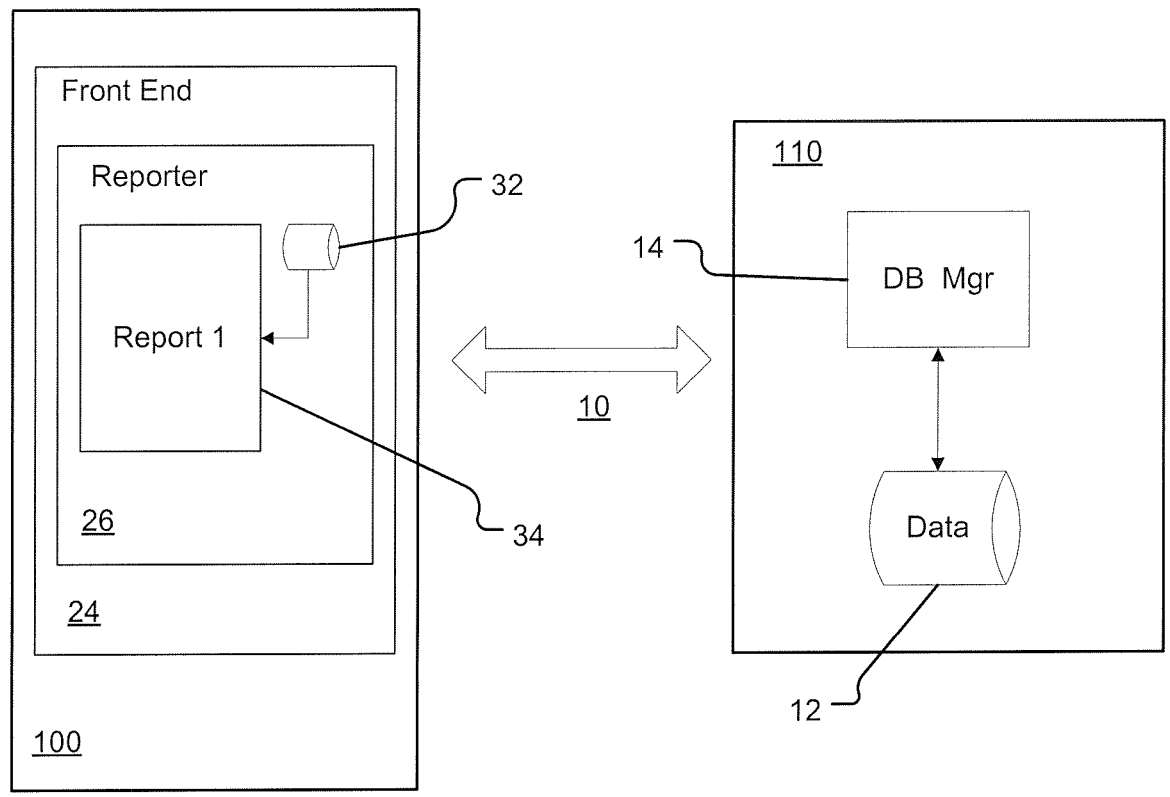
FIG. 1 illustrates a client-server database environment as practiced in the art.

The following detailed description is made with reference to the figures. Preferred embodiments are described to illustrate the present invention, not to limit its scope, which is defined by the claims. Those of ordinary skill in the art will recognize a variety of equivalent variations on the description that follows.

A client-server system for managing an OLAP database, including preparing reports based on the same, was presented in the Bennett Disclosure, cited above. The architecture taught there is summarized in FIG. 1, in which a client computer 100 is in communication with a server 110 using a communications channel 10. In one embodiment, communication is established over a public communications network, such as the internet, but in other embodiments the communications path can be a dedicated local or wide area network, or a direct connection.

It will be understood that both the client and server computers operate a variety of software applications, such as operating systems, net browsers and various other programs. The present disclosure focuses on specific applications programs, and those are the only programs illustrated below.

The server 110 includes an OLAP database 12, with a database management program 14 in operative communication with the same. The client system 100 includes a front end program 24, devoted to interacting with the database manager 14, as explained in the Bennett disclosure. One subsystem of the front end program is a reporter 26, which accepts user commands and specifications related to report generation; receives a dataset 32 associated with the report; generates the report 34, based on the dataset, user specific inputs, and preset user preferences; and displays the report to the user.

Figure 2:
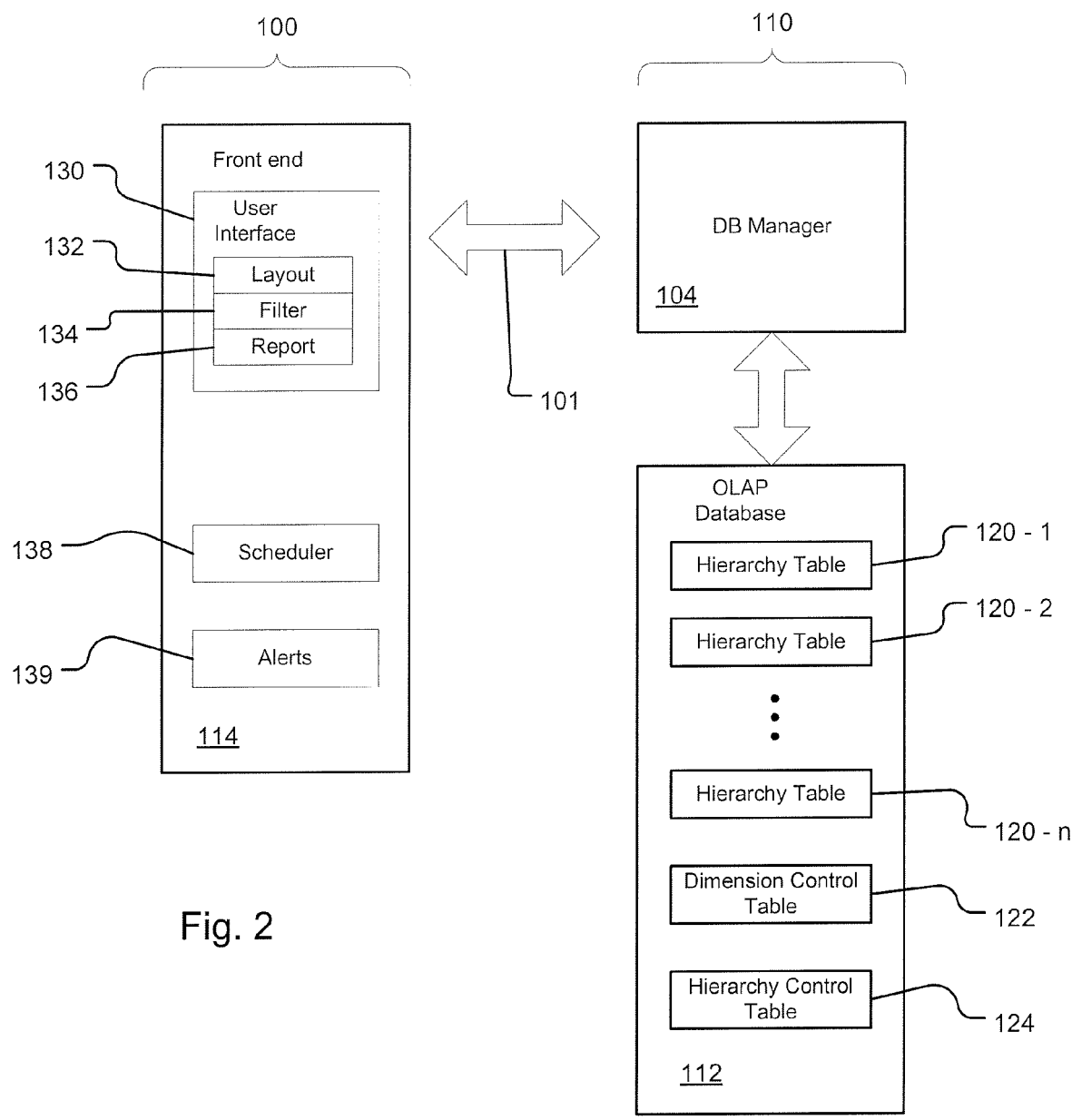
FIG. 2 depicts an embodiment of a client-server database environment according to the invention claimed herein.

FIG. 2 contains a schematic diagram of an embodiment of a system according to the invention claimed herein. Here, in the interest of clarity, the client system and server system are not shown per se, but the components located on the client side are grouped under the bracket 100, and those on the server side are grouped under bracket 110. Generally, the server side contains an OLAP database 112 and database manager 104, while the client aide includes, a front end program 114. It is understood that both the server and client sides include a number of other software systems, many of which interact with the systems shown. For present purposes, understanding and clarity are promoted by focusing on the systems depicted.

One embodiment of the OLAP database 112 may comprise a set of hierarchy tables 120 (denoted here as 120-1, 120-2, . . . 120-n), a dimension control table 122, and a hierarchy control table 124. Hierarchy tables 120 may comprise a database table configured to have dimensions and facts, with each fact being associated with a single dimension or combination of dimensions. Hierarchy tables 120 are arranged in a hierarchical topology, with the lowest level hierarchy table 120 having the most number of dimensions, the next higher level hierarchy table 120 having less dimensions than the lowest hierarchy table 120, the next higher level hierarchy table 120 having less dimensions than the next hierarchy table 120, and so on. That is, the hierarchy tables 120 may be configured as follows:

First Level (Lowest Level) Hierarchy Table:
Dimension$_1$, Dimension$_2$, . . . Dimension$_n$;
Fact$_1$, Fact$_2$, . . . Fact$_k$.

Second Level Hierarchy Table:
Dimension$_1$, Dimension$_2$, ... Dimension$_{n-1}$;
Fact$_1$, Fact$_2$, ... Fact$_k$.
Third Level Hierarchy Table:
Dimension$_1$, Dimension$_2$, ... Dimension$_{n-2}$;
Fact$_1$, Fact$_2$, ... Fact$_k$ and so on. Note that a second level hierarchy table may have one less dimension than the first level hierarchy table, while a third level hierarchy table may have one less dimension than the second level hierarchy table. Further note that the number of facts in each hierarchy table does not necessarily have to be different.

The hierarchical levels allow for faster data access in a level "n" compared to a level "n−1". That is, data can be accessed faster in the higher levels. The idea is to minimize the number of rows by eliminating dimensions successively. The elimination of dimensions results in smaller tables, which results in faster data access.

In one embodiment, the dimensions and facts in hierarchy tables 120 relate to online advertising. The dimensions may include advertisements, campaigns, contracts, and other advertising data, and facts relate to specific exposures of advertising to consumers ("impressions"). As a further example, each advertisement may belong to one or more advertising campaigns, with each advertising campaign being associated with one or more contracts, and so on. The facts may include impressions (i.e., displaying of an advertisement) and clicks on impressions. Thus, for each particular value of advertisement, campaigns, contracts, or combinations thereof there may be a corresponding impressions value and clicks value. For example, a particular advertisement for a particular advertising campaign may have 2,000 impressions. As another example, a particular advertising campaign with an associated contract may have resulted in 4,000 impressions and 1,000 clicks on the impressions. Of course, the number and type of dimensions and facts, and their corresponding values, may vary to meet the needs of specific applications.

Each hierarchy table 120 may be structured with facts for a particular combination of dimensions. As a particular example, assume that an exhaustive list of dimensions consists of advertisement, advertising campaign, and contract, a first (lowest) level hierarchy table 120 will include facts (e.g., impressions, clicks, or both) for the dimensions advertisement, advertising campaign, contract, or combinations thereof. Then, a second level hierarchy table 120 will include facts for the dimensions advertisement, advertising campaign, or combinations thereof, and so on. That is, for a particular number of dimensions, a hierarchy table 120 exists, containing the corresponding facts. In one embodiment, hierarchy tables 120 are manually populated using data from a data warehouse (not shown). Hierarchy tables 120 may also be populated using a script, for example. As can be appreciated, extracting data from a hierarchy table is generally faster than extracting data from an entire database. Hierarchy tables 120 thus provide a database structure that advantageously allows for relatively fast data access.

It is important to understand that the front end 114 is "thought" about the exhaustive list of all dimensions and facts, the relationship between each dimension (i.e. the hierarchy), the table names of each level of aggregation and the dimensions available in each aggregate table, the type of each dimension i.e. free form, tree or list box by using control tables. Thus, the front end can be thought of in the nature of metadata concerning the contents of the OLAP database.

In one embodiment, a dimension in an OLAP database 112 may be one of three kinds of dimensions namely, "pull-down," "tree," or "free-form." A pull-down dimension may have a value that is selectable from a pull-down menu. For example, assuming "advertisement" is a pull-down dimension, the values "Ad1" for a first advertisement or "Ad2" for a second advertisement may be selected in a pull-down menu for "advertisement." A tree dimension may have a value that is selectable from a hierarchical tree structure. For example, assuming "category" is a tree dimension, the values "automotive" for web pages relating to automotives or "travel" for travel-related web pages may be selected in a tree structure for "category." In the tree structure, the value "hotel" may be included as branching off the value "travel." A free-form dimension may have a value that may be entered without choosing from available selections. For example, assuming "revenue" is a free-form dimension, allowing a user to enter any revenue amount for "revenue."

As further shown in FIG. 2, the OLAP database 112 may include a dimensions control table 122. A dimensions control table 122 may comprise an exhaustive list of all dimensions and facts in all hierarchy tables 120, templates for constructing queries for each dimension, and a dimension look-up table. The dimension look-up table is employed in embodiments where the hierarchy tables 120 refer to dimensions using identifiers other than the dimensions' actual names (e.g., using "d2345" in a hierarchy table 120 to refer to a dimension "advertisement"). The dimension look-up table allows for translation of an identifier to actual name, and vice versa. A dimensions control table 122 may also have information on the kind of each dimension (e.g., whether a dimension is a pull-down, tree, or free-form) and conditional operators that may be used for a particular dimension.

An OLAP database 112 may also include a hierarchy control table 124. A hierarchy control table 124 may comprise information indicative of the data structure of the OLAP database 112. In one embodiment, a hierarchy control table 124 identifies each hierarchy table 120, the hierarchical order of the hierarchy tables 120, and the dimensions included in each hierarchy table 120. A hierarchy control table 124 may thus be consulted to identify the highest level hierarchy table 120 containing a particular set of dimensions and filters. Note that the highest level hierarchy table containing a particular set of dimensions and filters would advantageously have the least number of rows among hierarchy tables that also contain the set of dimensions and filters.

The general role of the front end is to optimally obtain that slice of the OLAP cube that contains all the data that the user is interested in viewing and displaying that slice of the OLAP cube in exactly the format that the user wishes to view. The filter page allows the user to slice the OLAP cube using criteria on the dimensions. The layout page allows the user to specify the format of the report.

Still referring to FIG. 2, a front end program 114 may comprise a user interface 130, a scheduler 138, and an alerts 139. In one embodiment, a front end program 114 is implemented using the Microsoft Visual Basic For Applications™ (VBA) programming language. A user interface 130 may comprise computer-readable program code for allowing a user to enter selection criteria and generate a report in accordance with the selection criteria. The selection criteria may be values for dimensions and facts. A user interface 130 may comprise a layout screen 132, a filter screen 134, and a report screen 136.

A layout screen 132 allows a user to select dimensions and facts of interest. The selected dimensions and facts will be the basis of a subsequently run report. Generally speaking, a layout screen 132 allows the user to specify the format of the report.

A filter screen 134 accepts dimensions that will be used as filters to the dimensions and facts selected in a layout screen 132. The general role of a front end program 114 is to optimally obtain that slice of an OLAP cube that contains all the data that the user is interested in viewing, and displaying that slice of the OLAP cube in exactly the format that the user wishes to view. In that regard, a filter screen 134 allows the user to slice the OLAP cube using filters on the dimensions.

In one embodiment, a front end program 114 has minimal processing load to allow it to adapt to a changing OLAP database 112 and to allow it to be more portable to other databases. Accordingly, in one embodiment, a front end program 114 works in a client-server relationship with an OLAP database 112 and is driven by tables in the OLAP database 112. This advantageously obviates the need for hard coding of available dimensions in the front end program 114 and offloads the processing burden to the OLAP database 112 (which may be running in a relatively fast server computer). For example, the front end program 114 may receive a dimensions control table 122 and display the exhaustive list of dimensions and facts in the dimensions control table 122 in a separate window.

A front end program that offloads the majority of processing to a server computer is especially important in online advertising. Unlike in mail order or catalog advertising applications, advertisement delivery over the Internet is essentially free in that an advertiser can send additional advertisements without incurring substantial additional cost. This results in a relatively large volume of impression data. A front end program 114 advantageously allows a client computer to access large amounts of data by using a back end server to do the "heavy lifting." This will have the desirable effect of scalability by essentially scaling the back end as opposed to being reliant on client computer resources (which in many ways are outside the control of the programmer). This also allows for robust programming and the ability to retrieve data even with relatively old or low capacity client computers.

A reporter 136 provides a report based on the dimensions and facts selected by a user in a layout screen 132 as filtered by the dimensions the user selected in a filter screen 134. The result may be viewed in a reporter 136. The dimensions for the report may be further configured by specifying new dimensions. An OLAP database 112 may have to be re-queried if the saved view does not include the data for the new dimensions, or if the user elects to rerun the view.

In the reporting system of the prior art, shown in FIG. 1, the front end 24 includes a reporter module 26, which interacts with the front end to structure queries to the database manager, to receive and temporarily store a dataset 32 in response to the query, and to organize and display a report 34 responsive to a user request. A weakness of the reporters of the prior art, however, is that they are able to work with only one report at a time. Only a single report is shown in FIG. 1, because when another report is desired, the existing report must be shut down and a new one initiated.

Figure 3:
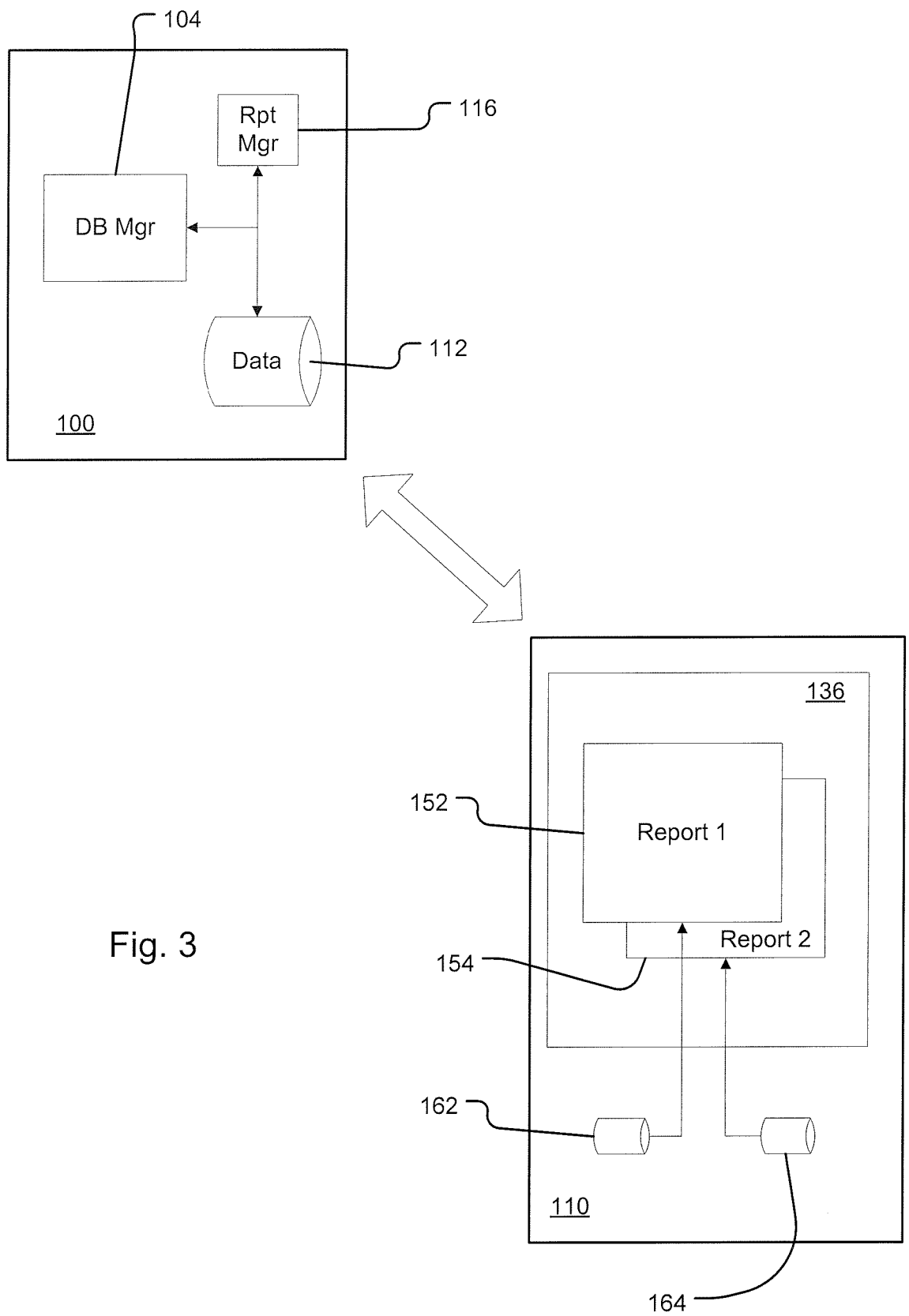
FIG. 3 illustrates the detailed operation of an embodiment of a reporting module operating in accordance with the principles set out herein.

FIG. 3 illustrates the operation of the report generation system according to the invention claimed herein. First, in addition to the database manager 104 and the database 112 on the server, there is added an independent report manager 116. This module interacts and communicates with the client report manager, as explained in detail below. On the client computer, the reporter module 136 is given the capability of generating multiple simultaneous reports, as illustrated by Report 1 152 and Report 2 154, depicted as existing simultaneously. Each report is supported by and based on a dataset retrieved from the OLAP database, identified as datasets 162 and 164, respectively.

Figure 4A:
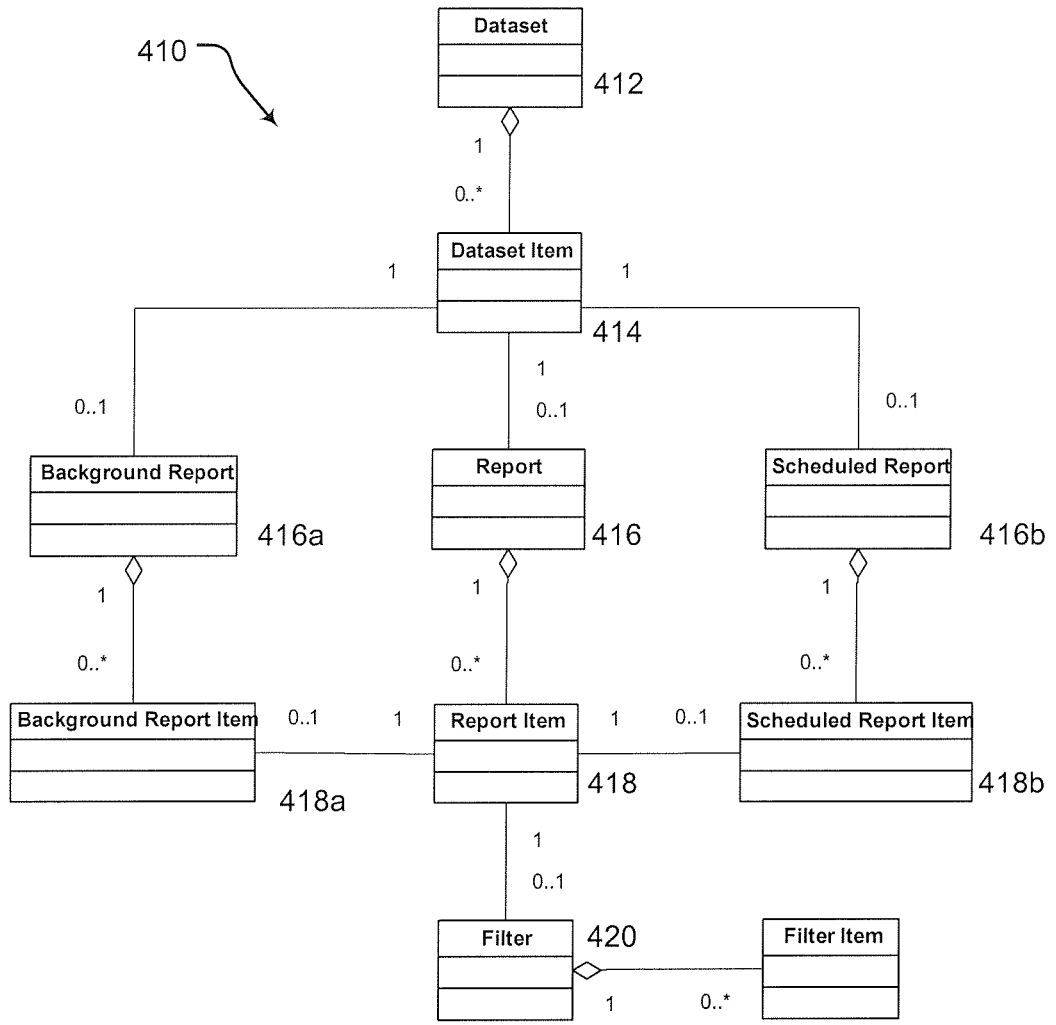
FIG. 4a illustrates a dataset model employed in an embodiment of the invention claimed herein.
Figure 4B:
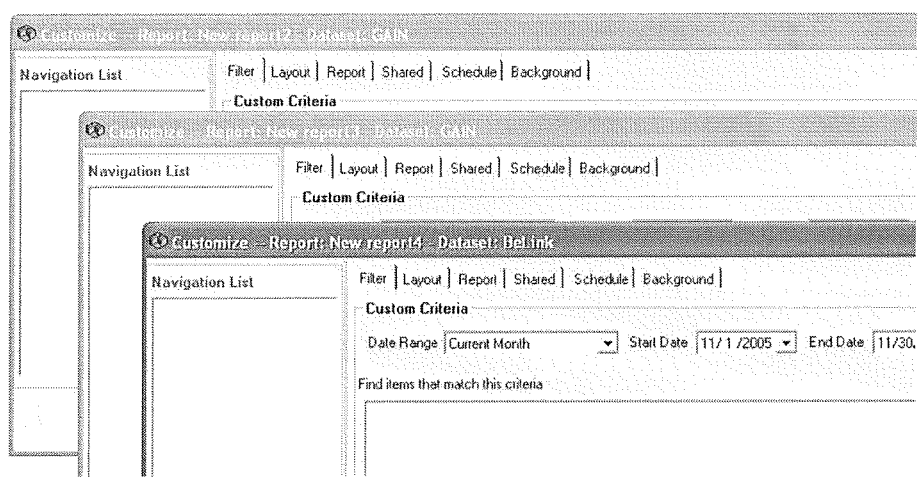
FIG. 4b depicts report control windows as employed in an embodiment of the invention claimed herein.

Datasets 162 and 164 are preferably structured as shown in the data diagram FIG. 4*a*. In this embodiment, the dataset class 410 consists of a hierarchical structure with dataset collection 412 at the top, and in descending structures dataset item 414, report collection 416, report item 418 and filter 420. Members of a dataset item are objects, so that specific instances of report items, such as background report 416*a* and scheduled report 416*b* are independent constructs that stand on their own. Such report items can be displayed as independent screen windows 460, shown in FIG. 4*b*. Additional information concerning the object controls is set out below, but those in the art will understand that each of the windows can be viewed and manipulated separately.

Figure 5:
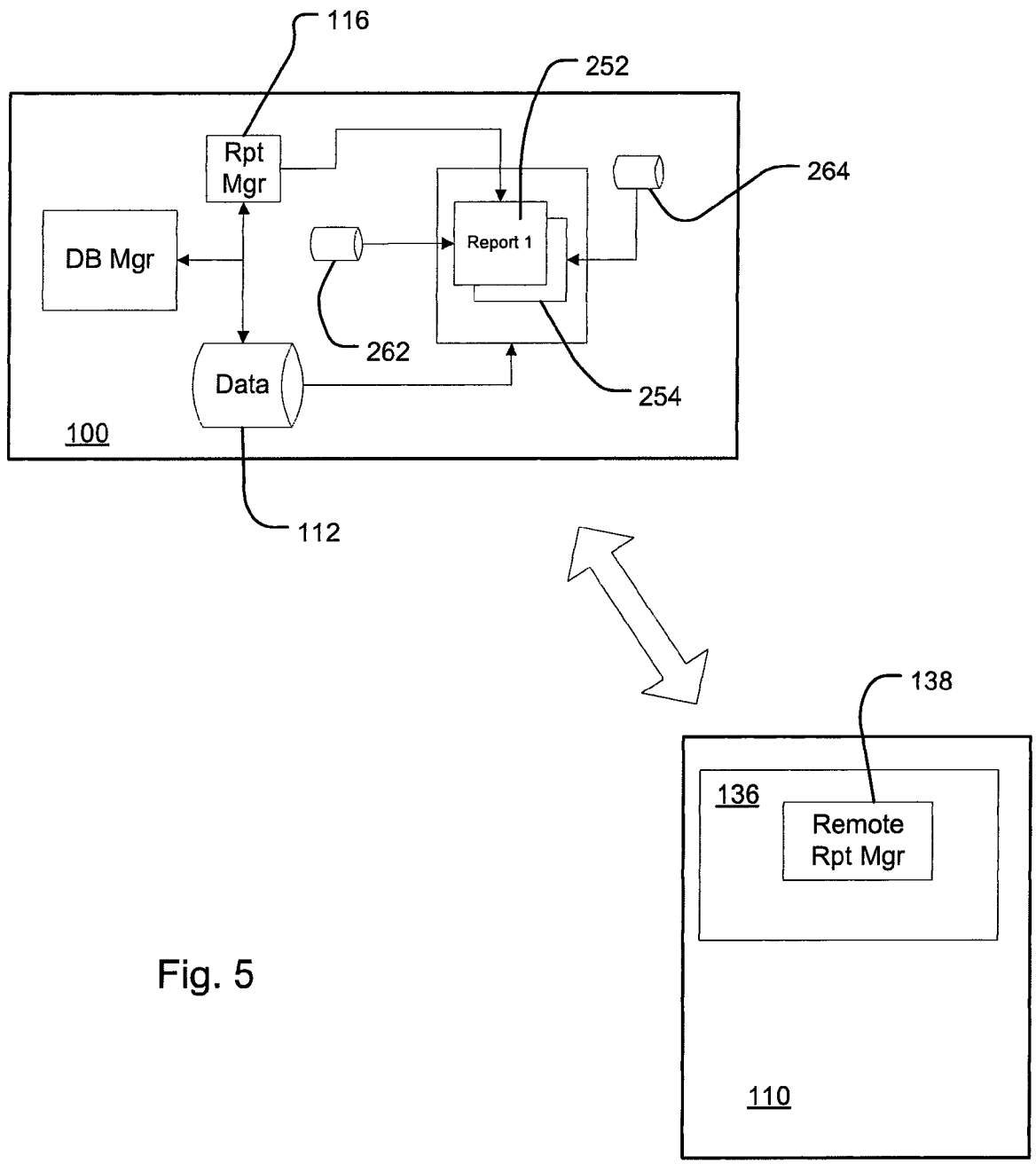
FIG. 5 depicts another embodiment of a client-server database environment according to the invention claimed herein.

Alternatively, it may be advantageous to run a report on the server rather than on the client computer. To provide for that eventuality, there is provided a remote report manager module 138, a component of reporter 136, shown in FIG. 5. As shown there, the remote report module communicates via the network to the report manager 116, resident on the server. The report manager retrieves a first dataset 262, which it then employs to structure a first report 252. The report module has the capability to generate multiple reports, based on multiple datasets. Here, a second report 254, based on a second dataset 264, are shown, and it is understood that a multiplicity of such reports can be run.

Figure 6A:
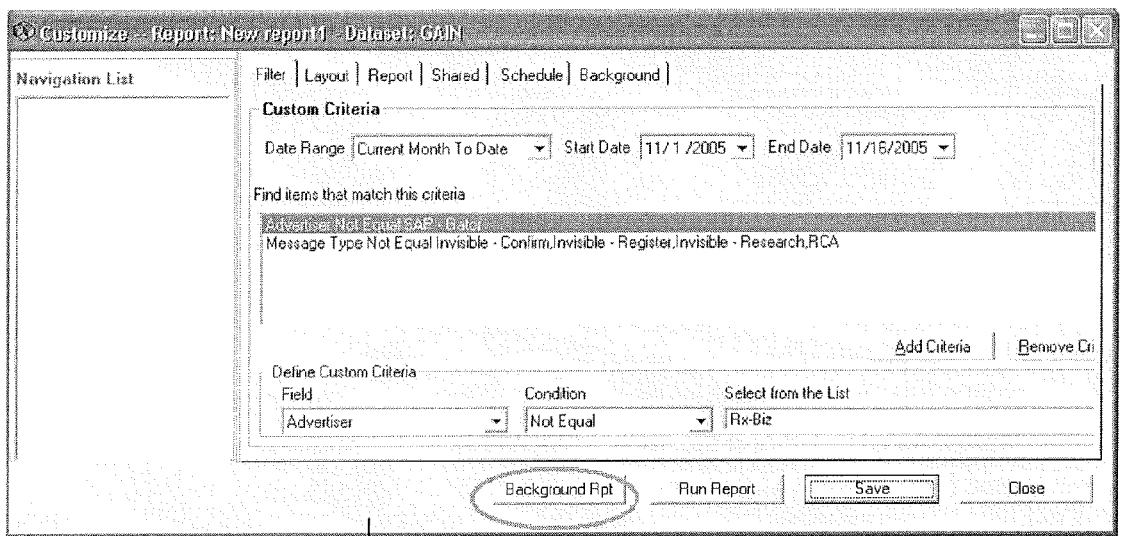
FIGS. 6a-6c depict report control windows as employed in an embodiment of the invention claimed herein.
Figure 6B:
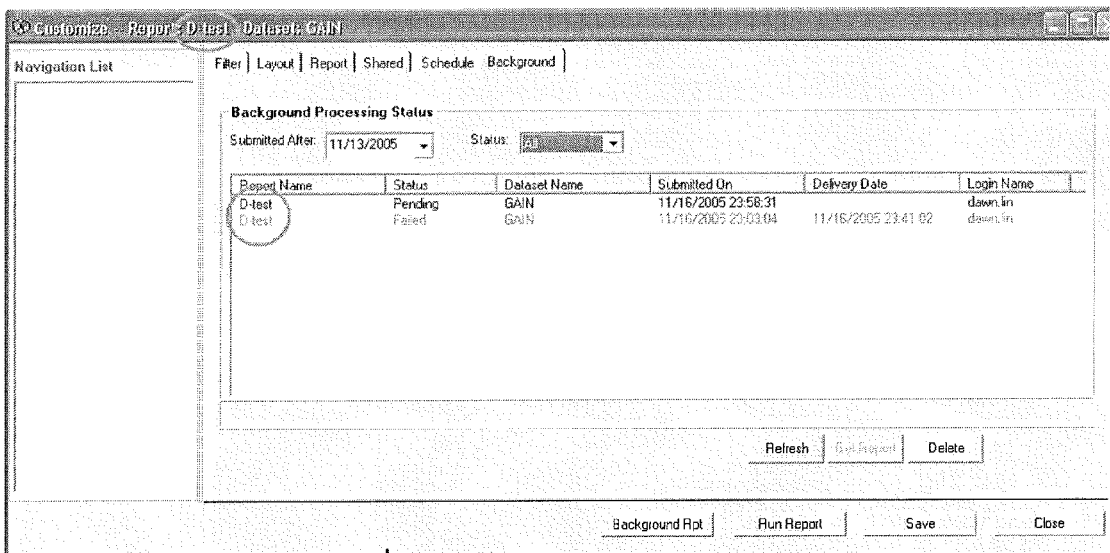
Figure 6C:
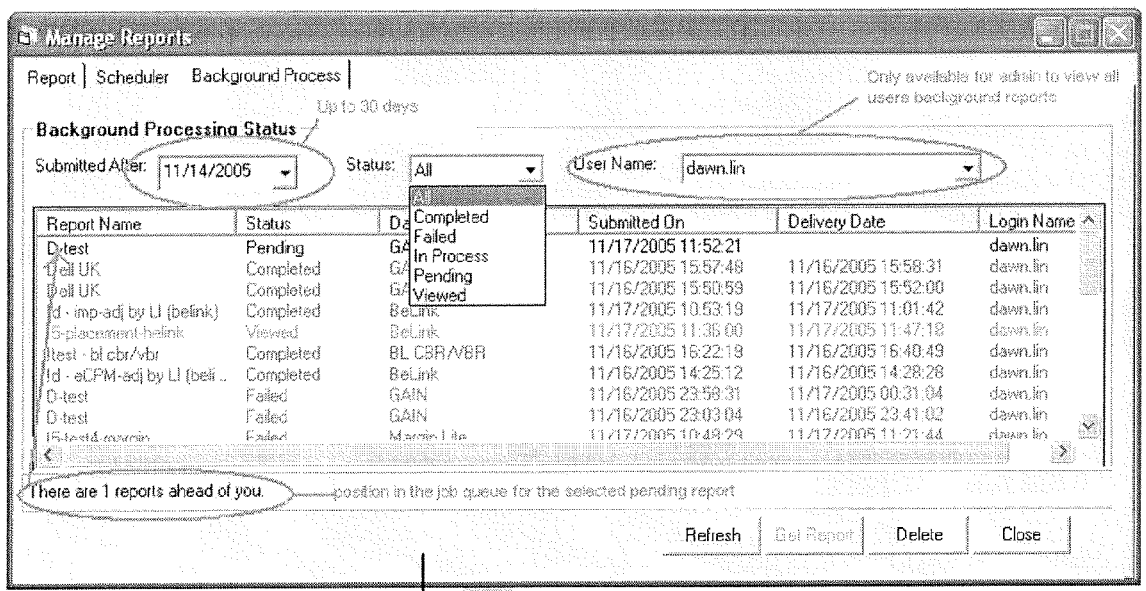

Generation and display of reports can be controlled as shown in the screenshots of FIGS. 6*a*-6*c*. The displayed embodiment illustrates one method for embodying a screen control for datasets and reports. Here, it will be understood that the specific screen controls operate in a generally straightforward manner, common to such controls in general use. Thus, functionality of such controls will not be set out in detail herein. Further, it will also be understood that a variety of techniques exist for embodying such controls. User interface designers will each choose different specific arrangements of controls to accomplish the tasks set out herein, and except as set out, any of the arrangements known in the art will suffice. Operation of the system as a whole is the key to the present invention, rather than specific characteristics of screen controls.

A basic report control window 602 is shown in FIG. 6*a*. In this embodiment the window employs a tab control that allows different functionalities to be invoked from a single window. To configure a report, the Filter tab is selected, which allows the user to specify report contents and parameters, such as the date range, standard criteria sets and custom criteria. The latter information can be specified by specific field. The user can choose where the report is to be run, on the local computer, using the "Run Report" button, or on the server, via the "Background Rpt." button.

FIG. 6*b* shows the same window in a different view, showing the Background tab. This button facilitates production of a single report, as shown. Management of all reports submitted can be accomplished in a separate window, shown in FIG. 6*c*. That figure illustrates the Background Process tab, which shows the status all reports in the server queue. Other buttons allow the user to examine other aspects of the reporting system, as shown.

While the present invention is disclosed by reference to the preferred embodiments and examples detailed above, it is understood that these examples are intended in an illustrative rather than in a limiting sense. It is contemplated that modifications and combinations will readily occur to those skilled

We claim as follows:

1. A method of creating reports, comprising:
receiving, from a client computer system, consumer information related to consumer internet behavior;
assembling the consumer information into an online analytical processing (OLAP) database, the OLAP database comprising:
a plurality of hierarchy tables configured to store at least some of the consumer information, each hierarchy table of the plurality of hierarchy tables comprising at least one fact associated with at least one dimension,
wherein the plurality of hierarchy tables are arranged such that each successive level of the plurality of hierarchy tables includes a greater number of dimensions,
wherein the OLAP database resides on a server system, the server system being connected to a communications network;
providing a report generation system, including a report generation module resident on the server system;
generating a first report, the generating comprising:
accepting user criteria from a front end system resident on the client computer system;
generating from the OLAP database a first dataset based on the user criteria;
forwarding the first dataset to the client computer system; and
generating the first report based on the first dataset;
displaying the first report generated from the first dataset; and
reiterating the generating the first report to generate another report, the first report remaining resident on the client computer system.

2. The method of claim 1, wherein the first dataset is a data object resident on the client computer system.

3. The method of claim 1, wherein the reiterating the generating the first report generates another dataset, resident on the client computer system together with the first dataset.

4. A method of creating reports, comprising:
receiving, from a client computer system, consumer information related to consumer internet behavior;
assembling the consumer information into an online analytical processing (OLAP) database, the OLAP database comprising a plurality of hierarchy tables configured to store at least some of the consumer information, each hierarchy table comprising at least one fact associated with at least one dimension,
wherein the plurality of hierarchy tables are arranged such that each successive level of the plurality of hierarchy tables includes a greater number of dimensions,
wherein the OLAP database resides on a server system, the server system being connected to a communications network;
providing a report generation system, including a report generation module resident on the client computer system, and a remote report module, resident on the server system;
generating a first report, the generating comprising:
accepting user criteria for generating the first report from a front end system resident on the client computer system;
generating from the OLAP database a first dataset corresponding to the user criteria and retaining the first report on the server system; and
generating the first report based on the first dataset;
displaying the first report on the client computer system under control of the remote report module; and
reiterating the generating the first report to generate a second report, the first report remaining resident on the server system.

5. The method of claim 1, wherein the first dataset is a data object resident on the server system.

6. The method of claim 1, wherein the reiterating the generating the first report generates a second dataset, the second dataset resident on the server system together with the first dataset.

7. A report generation system, comprising:
an online analytical processing (OLAP) database containing consumer information related to consumer internet behavior, the consumer information received from a client computer system, the OLAP database comprising a plurality of hierarchy tables configured to store at least some of the consumer information, each hierarchy table comprising at least one fact associated with at least one dimension,
wherein the plurality of hierarchy tables are arranged such that each successive level of the plurality of hierarchy tables includes a greater number of dimensions,
wherein the OLAP database resides on a server system, the server system being connected to a communications network; and
a report generation system including a report generation module resident on the client computer system, the report generation system being capable of:
accepting user criteria from a front end system resident on the client computer system,
generating from the OLAP database a first dataset based on the user criteria,
generating the first report based on the first dataset and the user criteria, and
reiterating the generating the first report to generate a second report, the first report remaining resident on the client computer system.

8. The method of claim 1, wherein the user criteria specifies a dimension of the first report.

9. The method of claim 1, wherein the user criteria specifies a fact of the first report.

* * * * *